United States Patent [19]

Pernelle et al.

[11] Patent Number: 5,160,524
[45] Date of Patent: Nov. 3, 1992

[54] INSTALLATION FOR THE HEATING, FORMING AND TEMPERING OF GLASS SHEETS

[75] Inventors: Robert Pernelle, Vernouillet; Michel Agius, Santeuil, both of France

[73] Assignee: Selas S.A., Levallois-Perret, France

[21] Appl. No.: 673,179

[22] Filed: Mar. 18, 1991

[30] Foreign Application Priority Data

Mar. 30, 1990 [FR] France .................. 90 04097

[51] Int. Cl.⁵ .............................. C03B 23/03
[52] U.S. Cl. ........................ 65/268; 65/273; 65/289
[58] Field of Search ............ 65/273, 287, 289, 106, 65/182.2, 268

[56] References Cited

U.S. PATENT DOCUMENTS

| | | |
|---|---|---|
| 3,665,730 | 5/1972 | Linzer . |
| 4,604,124 | 8/1986 | Strauss .................. 65/273 |
| 4,711,653 | 12/1987 | Frank et al. . |
| 4,840,657 | 6/1989 | Onain .................. 65/273 |
| 4,936,890 | 6/1990 | Colmon et al. .......... 65/273 |
| 5,022,908 | 6/1991 | Honjo et al. ........... 65/268 |

Primary Examiner—Joye L. Woodard
Attorney, Agent, or Firm—Young & Thompson

[57] ABSTRACT

An installation for the heating, forming and tempering of glass sheets (8) comprises a furnace (1) for heating glass sheets, at least one forming chamber (4), called a standard forming chamber, and a chamber for tempering the glass sheets, and a series of parallel rotary rollers for supporting the glass sheets and for moving them in the furnace (1) and towards the chambers. The installation further comprises at least one second forming chamber (5), called a deep-forming chamber, in which the forming of the glass sheets is carried out by pressing these on a convex lower surface. Between the furnace (1) and the forming chambers (4, 5) there is provided a turnover chamber (3) comprising a table rotatably mounted for turning over the glass sheets (8) before they are introduced into the second forming chamber (5). The invention is used especially in the production of glazings for motor vehicles.

15 Claims, 7 Drawing Sheets

FIG_1

FIG_2

FIG_3

FIG_6

FIG_9

FIG_10

INSTALLATION FOR THE HEATING, FORMING AND TEMPERING OF GLASS SHEETS

FIELD OF THE INVENTION

The present invention relates to an installation for the heating, forming and tempering of glass sheets.

The invention is concerned particularly with the production of convex glazing, such as side windows or rear windows or, if appropriate, windscreens of motor vehicles.

BACKGROUND OF THE INVENTION

Tempered glazing for motor-vehicles can be classified in three categories:
small slightly convex surfaces (side windows), referred to as standard convex bending or forming,
large slightly convex surfaces (some rear windows),
surfaces which are highly convex or of complex shapes (mainly rear windows) referred to as deep convex bending or forming.

On the one hand, these three types of motor-vehicle glazing are generally produced in three types of installations, each designed for producing one type of glazing and finding it very difficult if not impossible, to produce the other two types of glazings.

On the other hand, glazings having deep convex bending or forming, usually bent into convex shape by pressing between two forming surfaces, have defects attributable to the difficulty in winding the glazing around the convex forming surface and to the fact that the latter surface is a continuous pressing surface, that is to say one which bears on the entire surface of the glazing.

The object of the present invention is to provide a solution to the abovementioned problems, namely an installation which makes it possible to carry out a forming and tempering on any type of motor-vehicle glass, at the same time improving the quality of the glazing having deep convex bending or forming.

The installation to which the invention relates comprises a furnace for heating glass sheets, at least one forming chamber, called a standard forming chamber, and a chamber for tempering the glass sheets, and
means for supporting the glass sheets and for moving them in the furnace and towards the chambers.

SUMMARY OF THE INVENTION

In accordance with the invention, this installation is characterised in that it comprises at least one second forming chamber, called a deep-forming chamber, in which the forming of the glass sheets is carried out by pressing these on a convex lower surface, and in that between the furnace and the forming chambers there is provided a turn-over chamber comprising means for turning over the glass sheets before they are introduced into the second forming chamber.

Thus, the installation according to the invention comprises at least one standard forming chamber and one deep-forming chamber. The installation is therefore capable of carrying out both standard and deep formings and consequently of producing all types of motor-vehicle glazings.

Moreover, the turn-over chamber makes it possible to turn over the glass sheets before they are conveyed towards the deep-forming chamber, and therefore to bring the glass sheet in the turned-over state onto the convex lower surface of the deep-forming chamber, on which it is formed by pressing.

In contrast, when standard forming is to be carried out, the glass sheet is not turned over and is brought onto the conventional lower concave forming surface of the standard forming chamber, on which this sheet is formed by pressing.

According to a preferred version of the invention, the convex lower forming surface of the deep-forming chamber has a peripheral rim, the contour of which corresponds to that of the sheet in the formed state, this rim surrounding a cavity.

Thus, during the deep forming, the glass sheet is in contact only with the rim of the lower convex surface, so that the entire central part of the sheet is free and does not risk being marked or having defects.

Preferably, the cavity located within the peripheral rim of the convex forming surface is equipped with hot-air blowing holes, making it possible to generate under the sheet an air pressure sufficient to compensate the dead weight of the glass sheet in position on the rim. This prevents any risk of and deformation of the glass sheet in the abovementioned cavity.

According to an advantageous version of the invention, the means for turning over the glass sheets comprise a table mounted rotatably in the said turn-over chamber, this table being hollow and having at least one face equipped with a series of orifices distributed over this entire face, the interior of this table being connected to suction means for generating a sufficient vacuum within the table to lay a glass sheet onto the face equipped with orifices.

This turn-over table thus retains by suction the glass sheet which can thereby be turned over and moved towards the deep-forming chamber.

According to a preferred version of the invention, the installation possesses a series of parallel rotary rollers for supporting the glass sheets and for moving them towards the turn-over chamber and/or towards a forming chamber aligned with the heating furnace, means also being provided for removing the glass sheets from the said rollers in order to transfer them towards the chamber or chambers.

Preferably, these means comprise a suction table movable in translational motion above the rollers supporting the glass sheets and in parallel with these rollers, this table itself being equipped with rollers arranged in a plane parallel to that of the rollers supporting the glass sheets, the rollers of the table projecting under the lower face of this table, and suction orifices being formed between the rollers.

This suction table thus makes it possible to move the glass sheets towards the turn-over chamber or directly towards the standard forming chamber, the force applying the glass sheet onto the rollers of the table being very close to zero.

According to an advantageous feature of the invention, the rollers carried by the table are driven in rotation.

Thus, at the same time as the table moves a glass sheet in a translational movement, the rollers with which the glass sheet is in contact move the sheet in parallel with the table, making it possible:
to prevent the sheet from being marked in contact with the rollers, and
to adjust the position of the sheet in relation to the suction table.

Other features and advantages of the invention will also emerge from the following description.

BRIEF DESCRIPTION OF THE INVENTION

In the accompanying drawings given by way of non-limiting examples.

The installation, as illustrated in the accompanying figures, for the heating, forming and tempering of glass sheets comprises a furnace 1 for heating glass sheets, a suction chamber 2, a standard forming chamber 4, a deep-forming chamber 5 and a tempering chamber 6. All these chambers, with the exception of the tempering chamber, are heated to a temperature sufficient to keep the glass sheets in the plastic state.

The installation also possesses means for supporting the glass sheets and for moving them horizontally in the furnace 1 and towards the chambers 2 to 6.

According to the invention, the installation possesses, furthermore, between the furnace 1 and the forming chambers 4 and 5, a turn-over chamber 3 comprising means for turning over the glass sheets.

In the example illustrated, the furnace 1, suction chamber 2, the turn-over chamber 3 and the standard forming chamber 4 are aligned, whilst the deep-forming chamber 5 and the tempering chamber 6 are located next to the turn-over chamber 3 and to the forming chamber 4 respectively. All the walls of these chambers are covered with a refractory covering 7.

Figure 9:
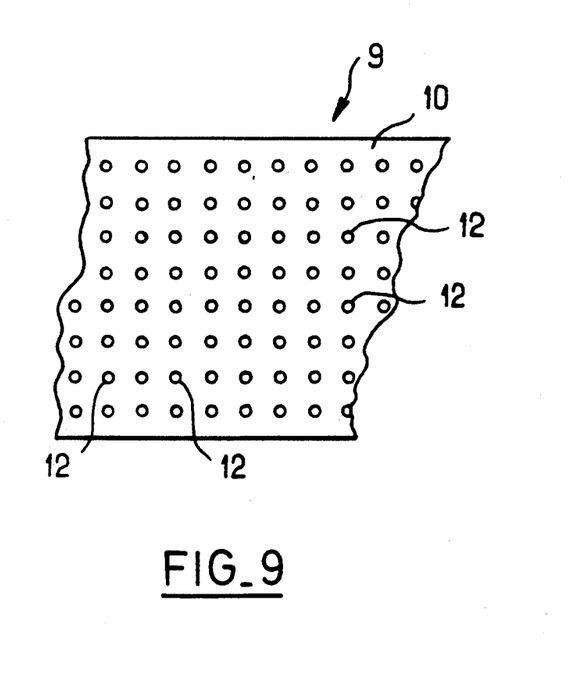
FIG. 9 is a partial top view of the turn-over table.

The means for turning over the glass sheets 8 comprise a table 9 mounted rotatably about an axis X—X' in the turn-over chamber 3. This table 9 is hollow and on its two opposite faces 10, 11 has a series of orifices 12 distributed over these entire faces (see FIGS. 3 and 9). The interior of the table 9 is connected by means of a pipe 9a (see FIG. 6) to suction means, such as a turbine (not shown), for generating a sufficient vacuum within the table 9 to lay a glass sheet 8 onto the face 10 or 11 equipped with orifices 12.

Moreover, the table 9 for turning over the glass sheets 8 is supported by means allowing the turned-over glass sheet 8 to be moved successively towards the deep-forming chamber 5.

For this purpose (see FIGS. 3 and 6), the opposite ends of the axis X—X' of rotation of the table 9 are supported by uprights 13 resting by means of rollers 14 on a rolling track 15 which extends between the turn-over chamber 3 and the deep-forming chamber 5.

Figure 1:
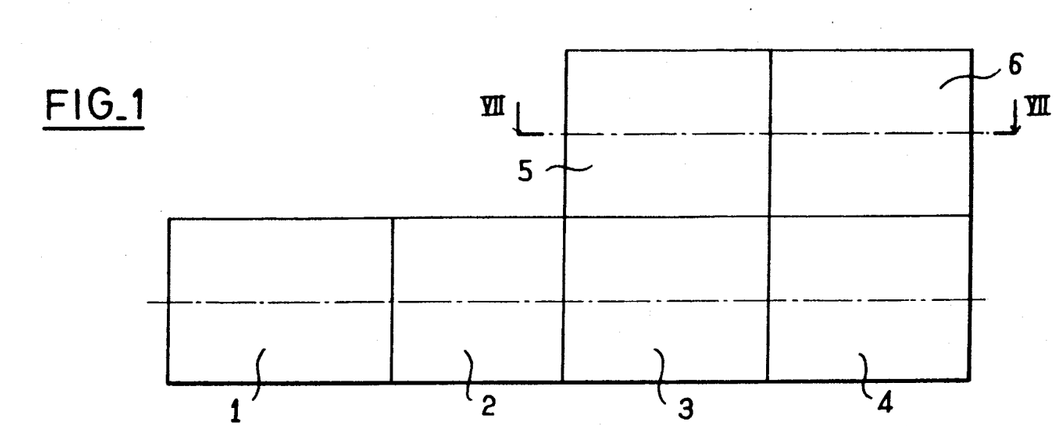
FIG. 1 is a plan view showing the location of the various units of the installation according to the invention.
Figure 2:
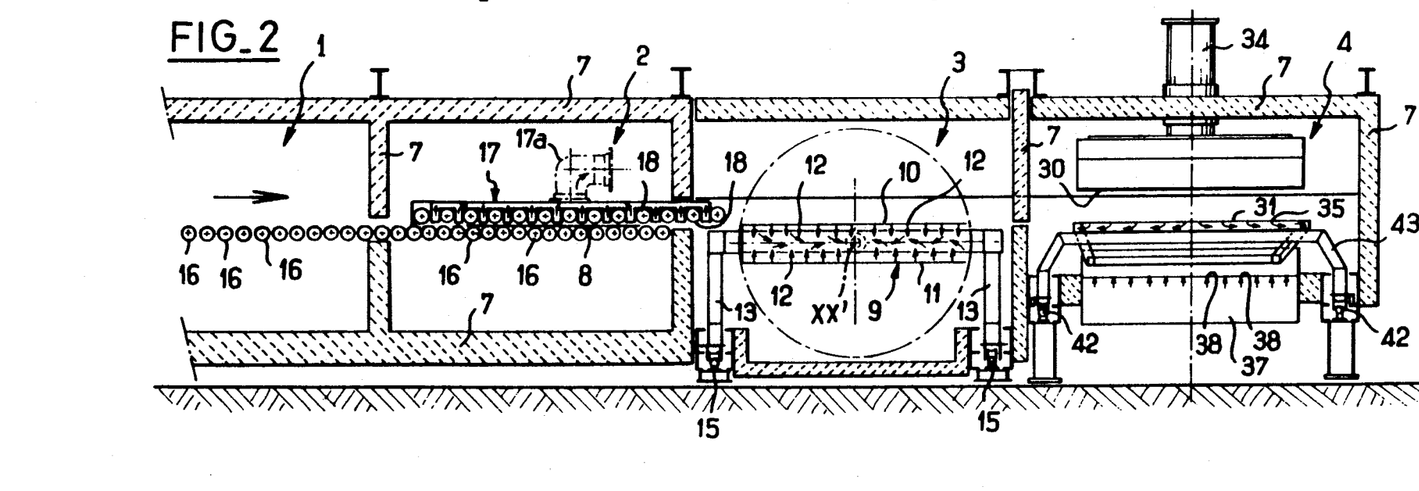
FIG. 2 is a view in longitudinal section of the furnace and suction, turn-over and standard forming chambers of the installation.
Figure 3:
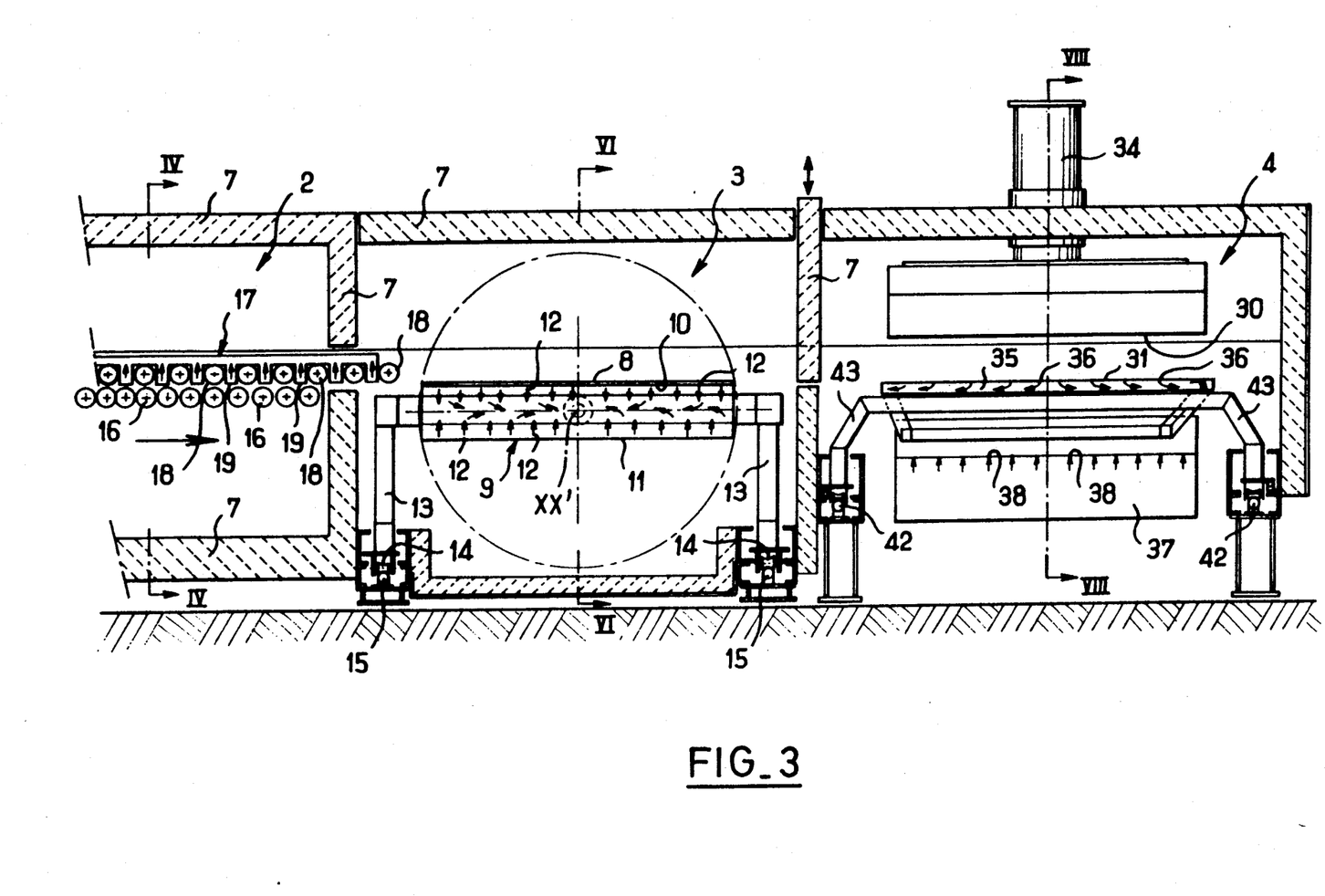
FIG. 3 is a view in longitudinal section of the suction, turn-over and standard forming chambers.

FIGS. 2 and 3 show that inside the furnace 1 and the suction chamber 2 there is provided a series of parallel rotary rollers 16 for supporting the glass sheets 8 (see FIG. 2) and for moving them horizontally towards the turn-over chamber 3 and/or towards the standard forming chamber 4 which is aligned with the heating furnace 1.

According to the invention, furthermore, means are provided for removing the glass sheets 8 from the rollers 16 in order to transfer them towards the said chamber or chambers 3, 4.

In the example illustrated, these means are designed for the suction of the glass sheets 8.

These means comprise (see FIGS. 2, 3, 4 and 5) a suction table 17 movable in translational motion above the rollers 16 supporting the glass sheets 8 and in parallel with these rollers 16. This table is itself equipped with rollers 18 arranged in a plane parallel to that of the rollers 16 supporting the glass sheets 8. The rollers 18 of the table 17 project below the lower face of this table 17, and suction orifices 19 are formed between the rollers 18 (see FIG. 5).

The interior of the table 17 is connected to a pipe 17a (FIG. 2), itself connected to a suction turbine (not shown).

Figures 4, 5:
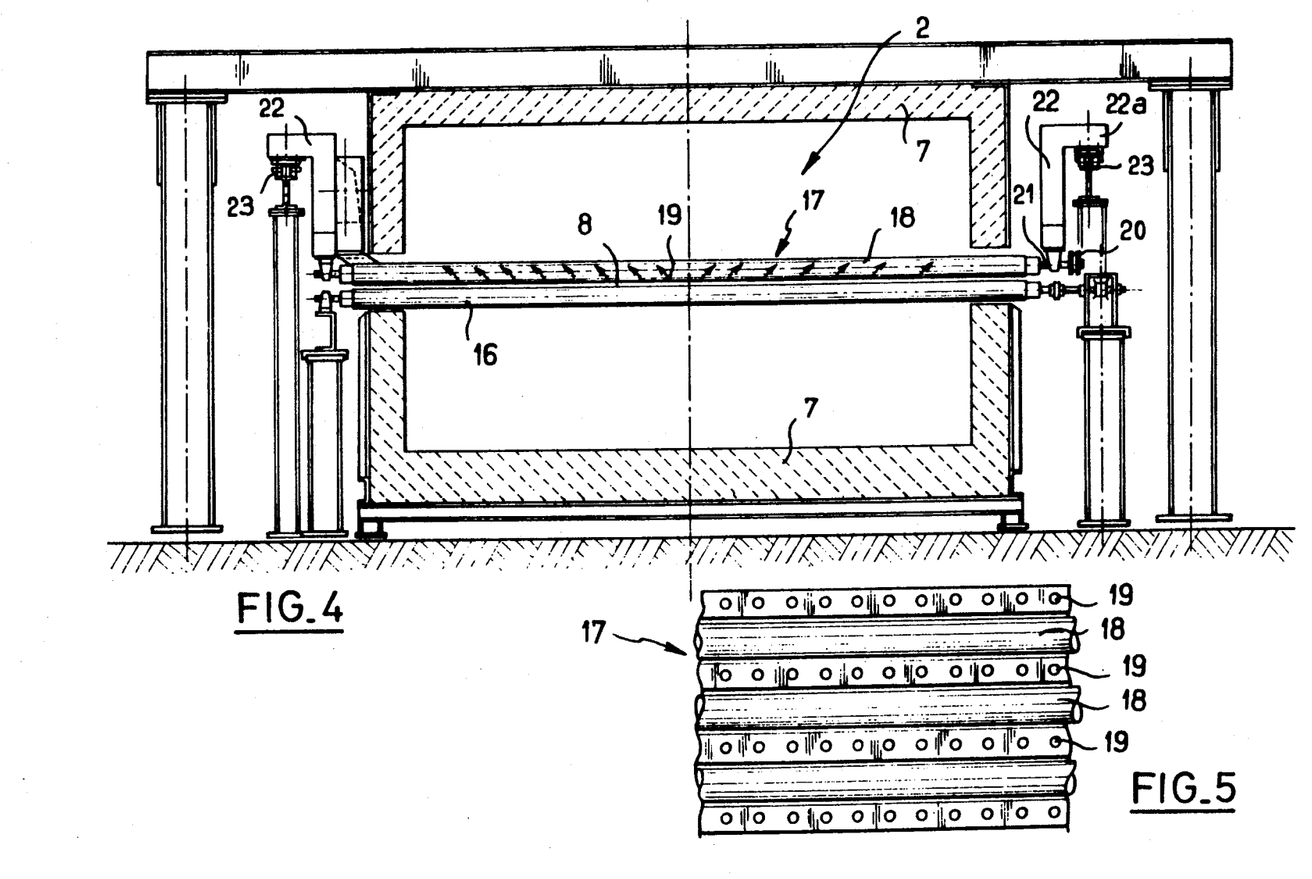
FIG. 4 is a sectional view in the plane IV—IV of FIG. 3.
FIG. 5 is a partial bottom view of the suction table.

It will be seen from FIG. 4, moreover, that the rollers 18 carried by the table 17 are driven in rotation by pulleys 20 mounted at the end of their axle 21 and connected to a motor (not shown) by means of a transmission member.

Furthermore, the ends of the axles 21 of the rollers 18 of the suction table 17 are supported by arms 22, the upper end 22a of which rests on a rolling track 23 extending in the suction chamber 2 and passing through the turn-over chamber 3 and forming chamber 4.

Moreover, the length of the suction table 17, as measured in the direction of its movement, exceeds that of the glass sheets 8.

On the other hand, the table 9 for turning over the glass sheets 8 has a face 10 intended for receiving the glass sheets 8 and arranged in the extension of the rollers 16 supporting the glass sheets, so that the suction table 17 can pass above the turn-over table 9, as shown in FIG. 3.

As mentioned above, the installation according to the invention comprises a standard forming chamber 4 and a deep-forming chamber 5. The standard forming chamber 4 receives the glass sheets 8 in the position which they occupy on the rollers 16 supporting them, whilst the deep-forming chamber 5 receives the sheets 8 in the turned-over position by virtue of the turn-over table 9.

Figure 8:
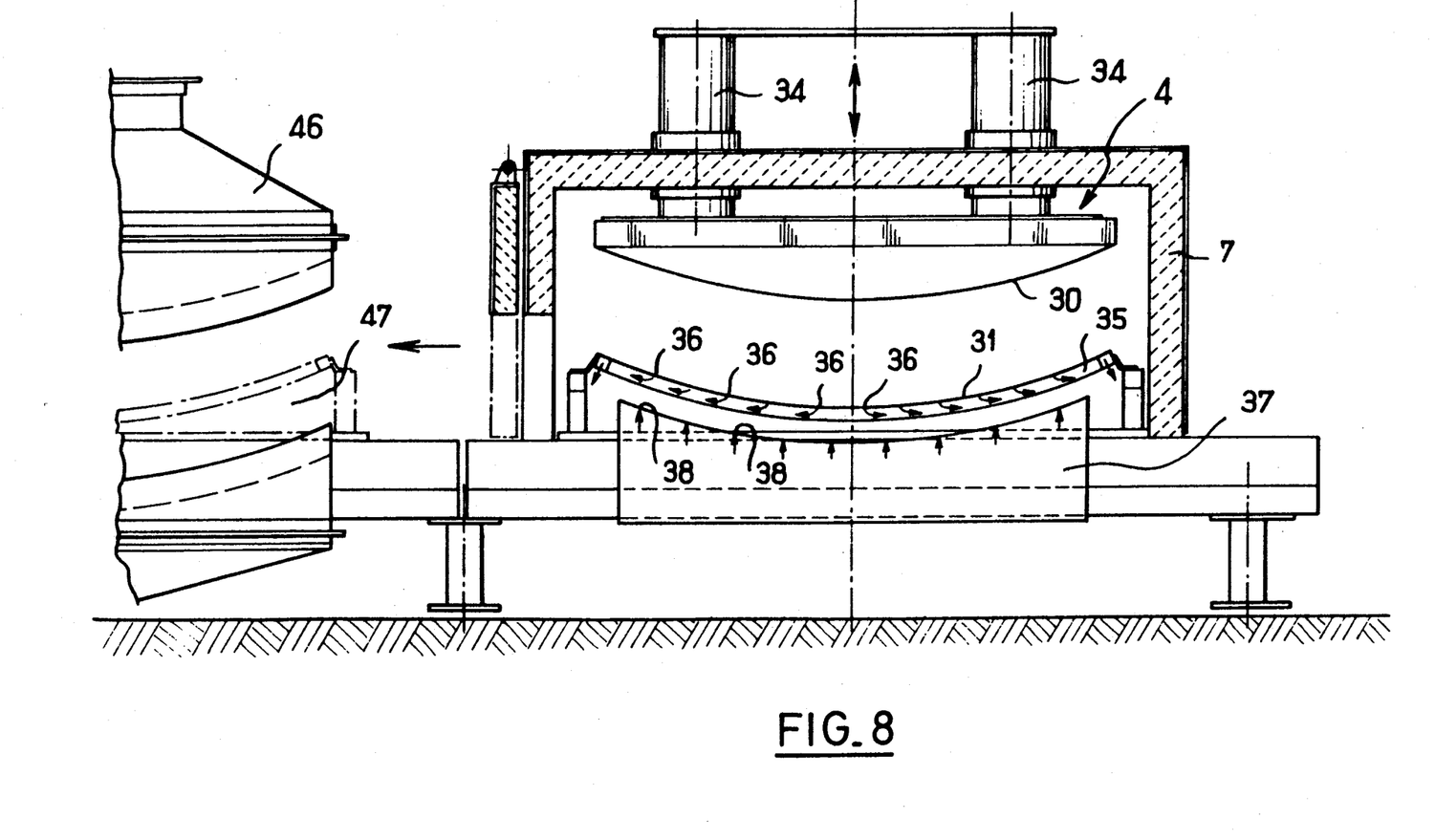
FIG. 8 is a sectional view in the plane VIII—VIII of FIG. 3.

The forming chambers 4 and 5 each comprise (see FIGS. 8 and 6) two forming surfaces 30, 31; 32, 33 movable towards one another. One of these surfaces is convex and the other concave.

Figure 6:
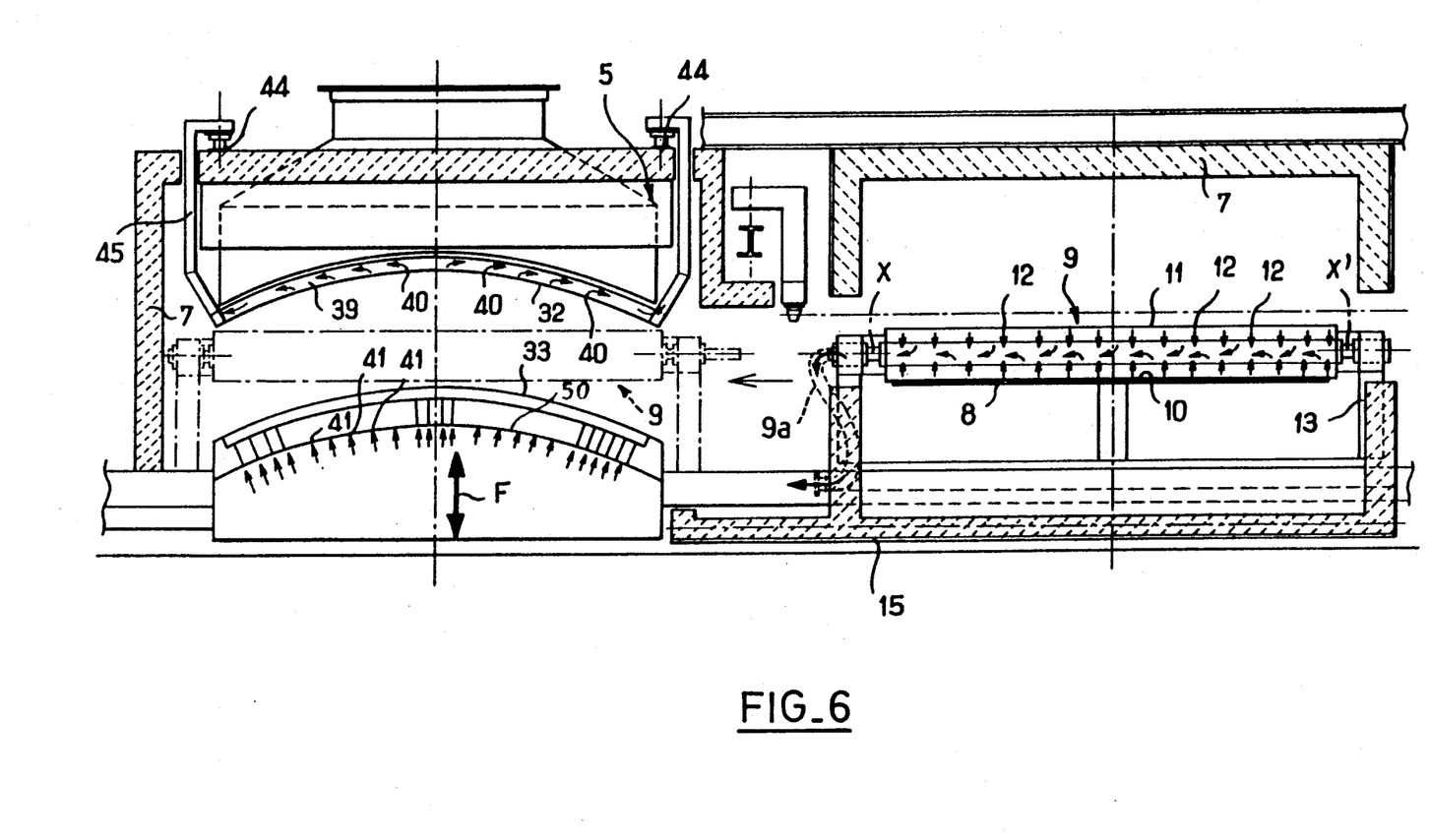
FIG. 6 is a sectional view in the plane VI—VI of FIG. 3, showing the turn-over chamber and the deep-forming chamber.

As regards the standard forming chamber 4 (FIG. 8), the concave forming surface 31 is movable horizontally towards the tempering chamber 6, and the convex forming surface 30 is movable vertically towards the chamber by means of control mechanisms 34.

Where the deep-forming chamber 5 is concerned (see FIG. 6), the concave forming surface 32 is movable horizontally towards the tempering chamber 6 and the convex forming surface 33 is movable vertically towards the chamber (see the arrow F in FIG. 6).

Figure 10:
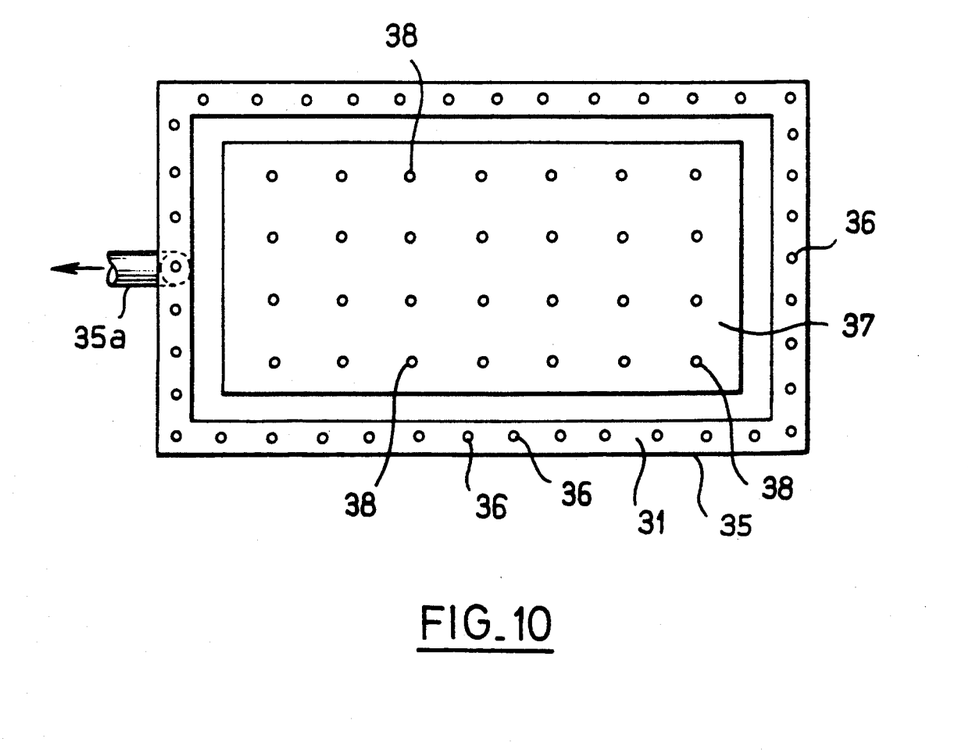
FIG. 10 is a top view of the lower part of the standard forming chamber.

Furthermore, in the standard forming chamber 4, the concave forming surface 31 is located in the lower part of the chamber and comprises (see also FIG. 10) a hollow collar 35 which is intended for receiving the sheet 8 to be formed and the contour of which corresponds to that of the sheet in the formed state. This collar 35 possesses, on its surface 31 intended for receiving a glass sheet 8, a series of holes 36 communicating with the interior of this collar 35 which is connected by means of a pipe 35a (see FIG. 10) to suction means (not shown) for generating a vacuum within this collar 35.

Moreover, arranged under the collar 35 (see FIGS. 8 and 10) is a body 37 having a series of holes 38 connected to means (not shown) for blowing hot air under a glass sheet 8 resting on the collar 35.

In the deep-forming chamber 5 (see FIG. 6), the horizontally movable concave forming surface 32 is located in the upper part of the chamber and comprises a hollow collar 39 intended for receiving the sheet to be formed. The contour of this collar 39 corresponds to that of the sheet in the formed state and possesses, on its surface 32 intended for receiving the sheet, a series of holes 40 communicating with the interior of this collar 39 and with suction means (not shown) for generating a vacuum in its interior.

On the other hand, the vertically movable convex forming surface 33 located in the lower part of the deep-forming chamber 5 has a peripheral rim which is intended to correspond to the contour of the sheet in the formed state and which surrounds a cavity or blowing box 50 having a series of holes 41 connected to means (not shown) for blowing hot air under the glass sheet, so as to prevent the glass sheet from sagging.

The operation of the installation according to the present invention will now be described.

The flat glass sheets 8 resting on the rollers 16 are first heated in the furnace 1 to a temperature of between 600° and 700° C. to make them suitable for subsequent forming.

The heated sheets are thereafter conveyed by the rotary rollers 16 towards the suction chamber 2 which is likewise heated to a particular temperature to prevent any cooling of the glass sheets. The suction table 17 is positioned above a glass sheet 8. When the suction means are activated, the glass sheet is sucked towards the table 17 located in the immediate vicinity of this sheet, so that the latter comes into slight contact against the rollers 18 of the suction table 17.

When the glass sheet 8 is to undergo standard forming, the table 17 is moved on its rolling track 23 directly towards the standard forming chamber 4.

During this movement, the table 17 passes above the turn-over table 9.

Moreover, during this movement, the glass sheet 8 laid under the suction table 17 experiences a translational motion relative to this table as a result of the rotation of the rollers 18 against which the sheet 8 is in contact, the effect of this being to prevent the marking of the glass sheet as a result of contact with these rollers 18 and to allow the glass sheet 8 to be positioned above the collar 35 of the forming chamber 4. Of course, the rotational speed of the rollers 18 will be relatively reduced so that the speed of movement of the sheet 8 in relation to the table is lower than the speed of movement of this table 17.

Of course, it is appropriate, in this respect, that the length of the table 17 should be sufficiently greater than that of the sheets to be transported.

At the end of travel, the table 17 brings the glass sheet 8 just above the collar 35 constituting the lower forming surface of the chamber 4.

It is sufficient subsequently to cut off the suction in order to release the glass sheet from the table 17 so that it is deposited on the collar 35.

As soon as the table 17 returns, the lowering of the convex forming surface 30 is commanded in order to match the forming profile of the glass sheet to that of the convex surface 30 and concave surface 31.

At the same time, jets of hot air are sent via the holes 38 towards the lower surface of the sheet 8, in order to keep the latter at the desired temperature and prevent it from experiencing deformation as a result of gravity through the collar 35.

When it is desired to carry out deep forming, the table 17 located in the suction chamber 2 and holding a glass sheet 8 under it is moved towards the turn-over chamber 3.

When the glass sheet 8 is located exactly above the turn-over table 9, the suction is cut off so that the glass sheet 8 can be deposited on the upper surface 10 of the table 9. A vacuum is then generated inside the table 9 so as to lay the sheet 8 onto the top of this table by suction.

The rotation of the table 9 about its axis X—X' is then commanded, so as to turn it over through 180° and so that the glass sheet 8 is located under the table. The glass sheet 8 remains laid under the table as a result of the suction. The table 9 can then be moved along the rolling tracks 15 towards the deep-forming chamber 5.

When the table 9 is located between the forming surfaces 32 and 33 (see the position represented by dot-and-dash lines in FIG. 6) the suction is cut off and the glass sheet 8 is deposited on the convex lower forming surface 33. The turn-over table 9 is then returned towards the turn-over chamber 3 in order to receive a new glass sheet 8 after being rotated through 180°.

As soon as the table 9 has left the forming chamber 5, the forming surface 33 on which the glass sheet 8 rests moves upwards in order to lay the sheet against the collar 39 and thus form this sheet according to the profile of the surfaces 33 and 32.

During this operation, hot-air jets are sent towards the sheet 8 via the holes 41 to prevent this sheet from sagging, whilst a vacuum is generated in the collar 39 in order to lay the periphery of the glass sheet 8 against the surface 32 of the collar 39 and thus prevent any lateral sliding of the sheet 8.

After the forming of the glass sheets 8, either in the standard forming chamber 4 or in the deep-forming chamber 5, the glass sheets 8 are moved successively towards the tempering chamber 6.

When a glass sheet 8 has been formed in the standard chamber 4, it is moved towards the tempering chamber 6 along the rolling tracks 42 (see FIG. 2), on which bears the frame 43 supporting the collar 35 supporting the formed glass sheet 8.

When a glass sheet 8 has been formed in the deep-forming chamber 4, it is moved towards the tempering chamber 6 along the rolling tracks 44 (see FIG. 6), on which bears the frame 45, from which is suspended the collar 39 holding by suction the glass sheet 8 which has undergone deep forming.

Figure 7:
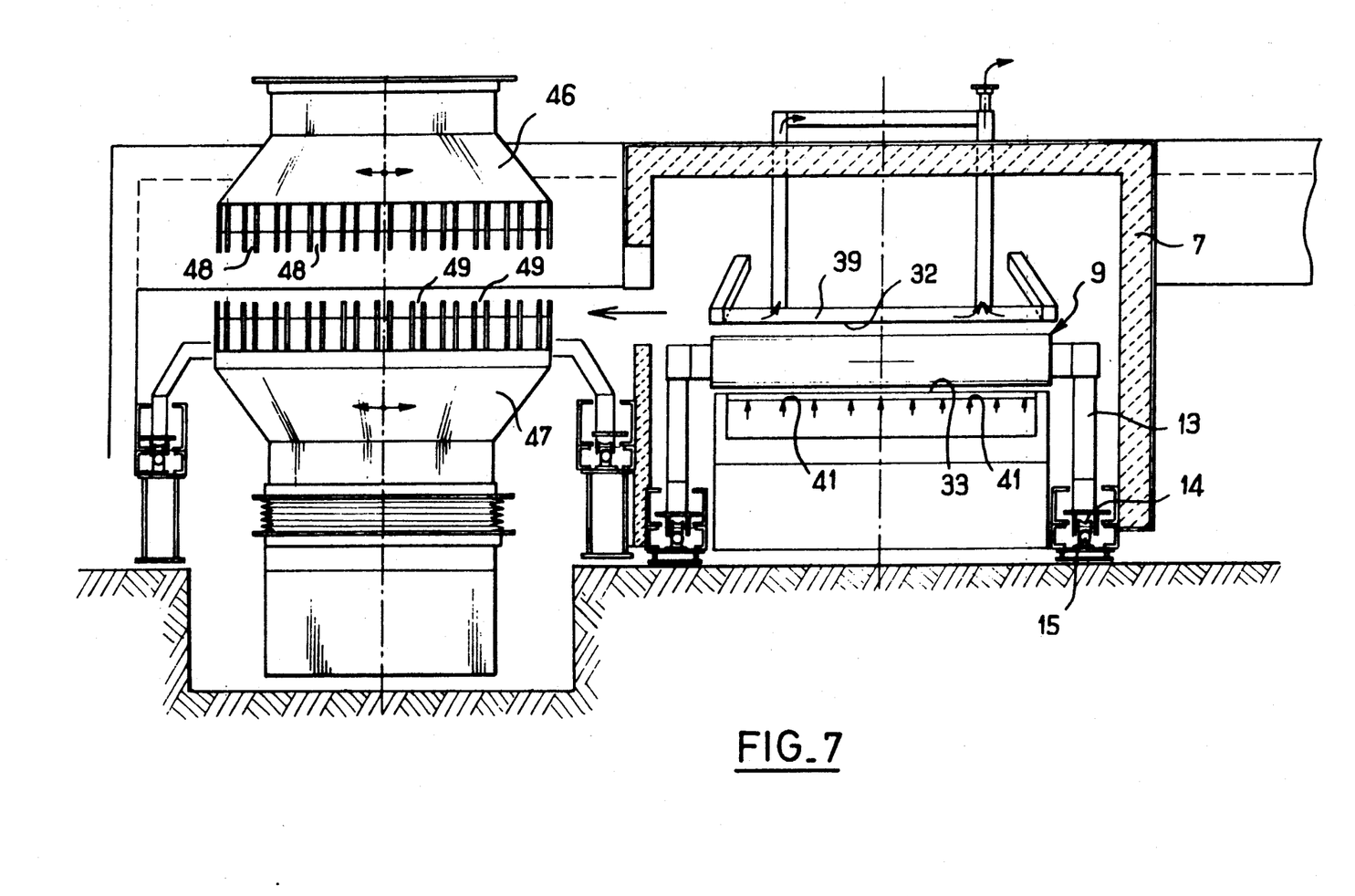
FIG. 7 is a sectional view in the plane VII—VII of FIG. 1.

During the tempering, the glass sheet 8 is placed (see FIG. 7) between two bodies 46, 47 having vertical channels 48, 49 which send on either side of the glass sheet 8 gas jets intended for the tempering of the glass sheet 8.

Of course, the invention is not limited to the illustrative embodiment just described, and many modifications can be made to this, without departing from the scope of the invention.

Thus, all the chambers could be aligned in series with one another.

We claim:

1. In an installation for the heating, forming and tempering of glass sheets (8), comprising a furnace (1) for heating glass sheets, at least one forming chamber (4), called a standard forming chamber, and a chamber (6) for tempering the glass sheets, and means for supporting the glass sheets and for moving them in the furnace (1) and towards the chamber, the improvement wherein the installation further comprises one second forming chamber (5), called a deep-forming chamber, in which the forming of the glass sheets is carried out by pressing them on a convex lower surface, and a turn-over chamber (3) positioned between the furnace (1) and the forming chambers (4, 5); said turn-over chamber (3) comprising means for turning over the glass sheets (8) before they are introduced into the second forming chamber (5).

2. Installation according to claim 1, wherein the convex lower surface (33) of the deep-forming chamber (5) has a peripheral rim whose contour corresponds to that of the sheet in the formed state, said rim surrounding a blowing box (50).

3. Installation according to claim 2, wherein the blowing box (50) located between the peripheral rim of the convex surface (33) is equipped with hot-air blowing holes (41).

4. Installation according to claim 1, wherein the means for turning over the glass sheets comprise a table (9) rotatably mounted in the turn-over chamber (3), said table (9) being hollow and having at least one face (10) equipped with a series of orifices (12) distributed over said entire face, and wherein the interior of said table (9) is connected to suction means (9a) for generating a sufficient vacuum within said table to lay a glass sheet (8) against said face (10).

5. Installation according to claim 4, wherein two opposite faces (10,11) of the table (9) are equipped with orifices (12).

6. Installation according to claim 1, wherein the table (9) has an axle (X—X'), on which it is rotatably mounted and whose opposite ends are supported by uprights (13) resting on a rolling track (15) by means of rollers (14).

7. Installation according to claim 1, wherein the means for turning over the glass sheets (8) are supported by means allowing the turned-over glass sheets to be moved toward the deep-forming chamber (5).

8. Installation according to claim 1, wherein the means for supporting the glass sheets (8) and for moving them horizontally towards the chambers include a series of parallel rotary rollers (16), said installation further comprising means for removing the glass sheets (8) from the rollers (16).

9. Installation according to claim 8, wherein the means for removing the glass sheets (8) from the rollers (16) comprise a suction table (17) movable in translational motion above the rollers (16) and in parallel therewith, said table (17) itself being equipped with rollers (18) arrange din a plane parallel to that of the rollers (16) supporting the glass sheets, said rollers (18) of the table (17) projecting below the lower face of the table (17), and suction orifices (19) being formed between the rollers (18) of the table (17).

10. Installation according to claim 9, wherein the rollers (18) of the table (17) are rotatably driven by pulleys.

11. Installation according to claim 9, wherein the length of the table (17), as measured in the direction of its movement, is greater than the length of the glass sheets (8).

12. Installation according to claim 8, wherein the table (9) for turning over the glass sheets (8) has a face (10) for receiving the glass sheets, and is located in a plane parallel to that of the rollers (16) supporting the glass sheets.

13. Installation according to claim 8, wherein the standard forming chamber (4) comprises a concave forming surface (31) located in its lower part and includes a hollow collar (35) for receiving a sheet (8) to be formed and whose contour corresponds to the sheet in the formed state, said collar (35) possessing on its surface (31) a series of holes (36) extending therethrough and operatively connected to a suction means for generating a vacuum within said collar (35).

14. Installation according to claim 13, further including a body (37) arranged under the collar (35), said body (37) having a series of holes (38) operatively connected to means for blowing hot air towards the glass sheet (8).

15. Installation according to claim 8, wherein the deep-forming chamber (5) comprises a concave forming surface (32) located in its upper part and includes a hollow collar (39) for receiving a sheet to be formed and whose contour corresponds to that of the sheet in the formed state, said collar (389) possessing on its surface (32) a series of holes (40) extending therethrough and operatively connected to suction means for generating a vacuum within said collar (39), in order to lay the glass sheet against the collar during its transport towards the tempering chamber (6).

* * * * *